United States Patent [19]
Chen et al.

[11] Patent Number: 6,096,429
[45] Date of Patent: *Aug. 1, 2000

[54] FUSER MEMBERS OVERCOATED WITH FLUOROCARBON ELASTOMER CONTAINING ZINC OXIDE AND CUPRIC OXIDE

[75] Inventors: Jiann-Hsing Chen, Fairport; Biao Tan, Rochester; Tonya D. Binga, Rochester; Charles E. Hewitt, Rochester, all of N.Y.

[73] Assignee: Eastman Kodak Company, Rochester, N.Y.

[*] Notice: This patent is subject to a terminal disclaimer.

[21] Appl. No.: 09/087,013

[22] Filed: May 29, 1998

[51] Int. Cl.$^7$ .......................... B32B 27/00; B32B 27/28; G03G 15/20
[52] U.S. Cl. ............................ 428/421; 428/906; 492/53; 399/333
[58] Field of Search .................................... 428/421, 906; 399/333; 492/53

[56] References Cited

U.S. PATENT DOCUMENTS

| | | | |
|---|---|---|---|
| 4,257,699 | 3/1981 | Lentz ........................................ | 399/324 |
| 4,264,181 | 4/1981 | Lentz et al. .............................. | 399/324 |
| 4,272,179 | 6/1981 | Seanor .................................... | 399/324 |
| 4,373,239 | 2/1983 | Henry et al. ............................. | 492/53 |
| 4,430,406 | 2/1984 | Newkirk et al. .......................... | 430/99 |
| 4,515,884 | 5/1985 | Field et al. ............................... | 430/99 |
| 4,518,655 | 5/1985 | Henry et al. ............................. | 428/329 |
| 4,970,098 | 11/1990 | Ayala-Esquilin et al. ............. | 428/36.4 |
| 5,017,432 | 5/1991 | Eddy et al. .............................. | 428/422 |
| 5,269,740 | 12/1993 | Fitzgerald et al. ...................... | 492/56 |
| 5,292,562 | 3/1994 | Fitzgerald et al. ..................... | 428/35.8 |
| 5,292,606 | 3/1994 | Fitzgerald .............................. | 428/35.8 |
| 5,336,539 | 8/1994 | Fitzgerald et al. ..................... | 428/36.8 |
| 5,464,698 | 11/1995 | Chen et al. .............................. | 428/421 |
| 5,480,724 | 1/1996 | Fitzgerald et al. ...................... | 428/447 |
| 5,595,823 | 1/1997 | Chen et al. .............................. | 428/421 |
| 5,906,881 | 5/1999 | Chen et al. .............................. | 428/141 |

OTHER PUBLICATIONS

J. J. Fitzgerald et al., "The Effect of Cyclic Stress on the Physical Properties of a Poly(Dimethylsiloxane) Elastomer", *Polymer Engineering and Science*, vol. 32, No. 18, (Sep. 1992), pp. 1350–1357.

Grant & Hackh's Chemical Dictionary, 5th Edition, p. 433, Oct. 1990.

*Primary Examiner*—Paul Thibodeau
*Assistant Examiner*—Ramsey Zacharia
*Attorney, Agent, or Firm*—Doreen M. Wells

[57] ABSTRACT

A fuser member useful for heat-fixing an electrographic toner to a substrate. The fuser member has a core and a layer overlying the core. The layer includes a cured fluorocarbon random copolymer having subunits with the general structures:

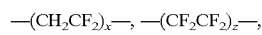

and

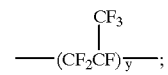

where x is from 30 to 90 mole percent, y is from 10 to 70 mole percent, and z is from 0 to 34 mole percent. The layer incorporates particulate filler. The filler includes zinc oxide, cupric oxide and a material selected from the group consisting of alkali metal oxides, alkali metal hydroxides, and combinations thereof. The filler has a total concentration in the layer of 12 to 75 percent of the total volume of the layer. The zinc oxide and cupric oxide have a total concentration of 10 to 70 percent of the total volume of the layer.

10 Claims, 4 Drawing Sheets

FUSER MEMBERS OVERCOATED WITH FLUOROCARBON ELASTOMER CONTAINING ZINC OXIDE AND CUPRIC OXIDE

FIELD OF THE INVENTION

This invention relates to fuser members useful for heat-fixing a heat-softenable toner material to a substrate. More particularly, the invention relates to fuser members overcoated with fluorocarbon elastomer containing zinc oxide and cupric oxide.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is intended to be heated by an external heat source.

Optimal metal-particle filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups 1b, 2a, 2b, 3a, 3b, 4a, 4b, 5a, 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler has proven false in the face of latter efforts in the art.

A metal-containing filler which provides good results in one elastomer may provide very poor results in another elastomer, even if the elastomers are very similar.

U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (column 9. line 50-column 10 line 47)

In U.S. Pat. No. 4,264,181 to Lentz et al, good results were obtained when lead oxide was used as a filler in various fluorocarbon elastomers (Viton® E430, Viton® E60C, Viton® GH; Examples X, XI, XII). In U.S. Pat. No. 5,017, 432 to Eddy et al, on the other hand, the use of lead oxide in similar fluorocarbon elastomers (for example, Viton® GF) is taught against on the basis that it would produce an unacceptable fuser member. In these fluoroelastomers, cupric oxide is preferred.

U.S. Pat. No. 4,272, 179 to Seanor and U.S. Pat. Nos. 4,264,181 and 4,257,699 to Lenz teach the use, as a release oil, of a polydimethylsiloxane that incorporates mercapto functional groups. These patents indicate that lead oxide filler in the outer elastomer layer interacts with the mercapto functionalized PDMS fluid to yield a release film on the surface of the fuser member.

An additional difficulty that has faced those attempting to produce metal-filled elastomer fuser members has recently been identified. In the past, it was thought that various materials' suitability for use in fuser member layers in terms of their stability during use—i.e., their ability to resist degradation (as evidenced by weight loss), creep, and changes in hardness, during use in fuser members—could be determined by subjecting samples of the materials to conditions of continuous high temperature and continuous high stress (i.e., pressure), and then measuring the resultant changes in weight, shape (e.g., length), and hardness (e.g., storage modulus). However, J. J. Fitzgerald et al, "The Effect of Cyclic Stress on the Physical Properties of a Poly (Dimethylsiloxane) Elastomer", *Polymer Engineering and Science*, Vol. 32, No. 18, (September 1992), pp. 1350–1357; indicates that such testing does not accurately portray the stability the materials will exhibit during actual use in fuser member base cushion layers and that dynamic testing, with cycles of loading and unloading is necessary. The publication cites other reports showing the same kind of results in studies of other elastomers. Accordingly, a device called a Mechanical Energy Resolver (sometimes alternatively referred to herein as an "MER") has been developed, which can be used to test samples of materials of interest for use in fuser member layers. The device applies beat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in a fuser member during actual use.

The realization of the need for dynamic testing has promised more accurate evaluation of filled elastomers, however, preparation of metal containing elastomers remains problematic. U.S. Pat. No. 4,515,884 to Field et al, and U.S. Pat. No. 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65- column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

In electrophotographic fuser systems, fuser members are commonly made with an overcoat layer of polysiloxane elastomer, polyfluorocarbon resin, or polyfluorocarbon elastomer.

Polysiloxane elastomers have relatively high surface energy and relatively low mechanical strength, but are adequately flexible and elastic and can produce high quality fused images. After a period of use, however, the self release property of the roller degrades and offset begins to occur. Application of a polysiloxane fluid during roller use enhances te ability of the roller to release toner, but shortens roller life due to oil absorption. Oiled portions tend to swell and wear and degrade faster.

One type of material that has been widely employed in the past to form a resilient base cushion layer for fuser rolls is condensation-crosslinked siloxane elastomer. Disclosure of filled condensation-cured poly(dimethylsiloxane) "PDMS" elastomers for fuser rolls can be found, for example, in U.S. Pat. Nos. 4,373,239; 4,430,406; and 4,518,655. U.S. Pat. No. 4,970,098 to Ayala-Esquillin et al teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cummings Co., U.S.A. It has been found that fuser rolls containing EC4952 cushion layers exhibit serious stability problems over time of use, i.e., significant degradation, creep, and changes in hardness, that greatly reduce their useful life. MER test results correlate with and thus accurately predict the instability exhibited during actual use. Nevertheless, materials such as EC4952 initially provide very suitable resilience, hardness, and thermal conductivity for fuser roll cushion layers.

Some filled condensation-crosslinked PDMS elastomers are disclosed in U.S. Pat. No. 5,269,740 (copper oxide filler), U.S. Pat. No. 5,292,606 (zinc oxide filler), U.S. Pat. No. 5,292,562 (chromium oxide filler), U.S. patent application Ser. No. 08/167,584 (tin oxide filler), U.S. patent application Ser. No. 08/159,013 (nickel oxide filler). These materials all show much less change in hardness and creep than EC4952 or the PDMS elastomer with aluminum oxide filler. U.S. Pat. No. 5,292,606 and U.S. patent application Ser. No. 08/167,584 disclose that tin oxide filler and zinc oxide filler can provide very good results in PDMS.

Fluorocarbon resins like polytetrafluoroethylene (PTFE) or a copolymer of PTFE and perfluoroalkylvinylether, or fluorinated ethylenpropylene have excellent release characteristics due to very low surface energies, high temperature resistance, and excellent chemical resistance. Fluorocarbon resins are, however, less flexible and elastic than polysiloxane elastomers.

Polyfluorocarbon elastomers such as vinylene fluoride-hexafluoropropylene copolymers are tough, flexible elastomers that have excellent high temperature resistance, but relatively high surface energies, (which compromise toner release), and poor thermal conductivity.

U.S. Pat. No. 5,595,823 (Chen et.al ) and U.S. Pat. No. 5,464,698 (Chen et al.) teach that the Viton® elastomer containing zinc oxide shows an increase in hardness almost more than 100% (106%). They also demonstrated that Mechanical Energy Resolver (MER) is a reliable technique for predicting potential changes in both hardening and creep when an elastomer is used as the fusing roller overcoat. Accordingly, it can be used as a reliable predictor of fuser roller life. Therefore, if the zinc oxide is getting hard, it would be expected that the roller would harden with increased life resulting in a reduction in the fusing nip, dwell time in the nip and adversely impacting the fusing quality. Thus, these two references teach away from zinc oxide as a filler for the purpose of the present invention.

It would be desirable to provide a fuser member with a Viton® elastomer overcoat incorporated with zinc oxide filler will exhibit good resistance to degradatively change in hardness. The present invention meet this need.

SUMMARY OF THE INVENTION

The invention provides a fuser member comprising a core and a layer overlying said core, said layer comprising:

a) a cured fluorocarbon random copolymer comprising sub-units having the general structures:

—(CH$_2$CF$_2$)$_x$—, —(CF$_2$CF$_2$)$_z$—, and $$—(CF_2CF)_{\overline{y}}—;$$
$$\quad\quad\quad|$$
$$\quad\quad\quad CF_3$$

wherein
x is from 30 to 90 mole percent,
y is from 10 to 70 mole percent, and
z is from 0 to 34 mole percent;

b) particulate fillers including zinc oxide and cupric oxide; and c) a material selected from the group consisting of alkaline earth metal oxides, alkaline earth metal hydroxides, and combinations thereof; said particulate fillers having a total concentration in said layer of 12 to 75 percent of the total volume of said layer, said zinc oxide and cupric oxide having a concentration of 10 to 70 percent of the total volume of said layer.

The invention provides a fuser roll useful for heat-fixing an electrophotographic toner to a substrate, wherein the roll comprises a core and a layer overlying the core. This overcoat layer provides an improved zinc oxide filled Viton® elastomer by surface treating the surface of zinc oxide with particulate coupling agents and a cupric oxide (CuO) filler is presented in an amount of from about 40 parts to 100 parts by weight per 100 parts by weight of fluoropolymer. The zinc oxide filler has a total concentration of from about 10 parts to 220 parts by weight of fluoropolymer. The overcoat layer of such roller has been unexpectedly found to exhibit only minimal weight loss, creep, and change in hardness over time, when subjected to conditions of elevated temperature and cyclic stress.

The invention provides a fuser member with a layer that includes a metal oxide filled polyfluorocarbon elastomer that has a moderate surface energy.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The fuser roll of the invention has a core, a base cushion superimposed on the core and an outer layer superimposed on the base cushion.

The outer or "overcoat" layer comprises a cured fluorocarbon random copolymer having subunits with the following general structures:

—(CH$_2$CF$_2$)$_x$—(vinylidene fluoride subunit ("VF")),

—(CF$_2$CF$_2$)$_z$—(tetrafluoroethylene subunit ("TFE")), and $$—(CF_2CF)_{\overline{y}}—\quad\text{(hexafluoropropylene subunit ("HFP"))}.$$
$$\quad\quad\quad|$$
$$\quad\quad\quad CF_3$$

In these formulas, x, y, and z are mole percentages of the individual subunits relative to a total of the three subunits (x+y+z), referred to herein as "subunit mole percentages". The curing agent can be considered to provide an additional "cure-site subunit", however, the contribution of these cure-site subunits is not considered in subunit mole percentages. In the fluorocarbon copolymer, x has a subunit mole percentage of from 30 to 90 mole percent, y has a subunit mole percentage of from 10 to 70 mole percent, and z has a subunit mole percentage of from 0 to 34 mole percent. In a currently preferred embodiment of the invention, subunit mole percentages are: x is from 40 to 80, y is from 10 to 60, and z is from 0 to 34; or more preferrably x is from 42 to 75, y is from 14 to 58, and z is 0. In the currently preferred embodiments of the invention, x, y, and z are selected such that fluorine atoms represent at least 70 percent of the total formula weight of the VF, HFP, and TFE subunits.

The outer layer includes particulate filler comprising zinc oxide/cupic oxide and additional particulate selected from alkaline earth metal oxides, alkaline earth metal hydroxides, and combinations of alkaline earth metal oxides and hydroxides. In a currently preferred embodiment of the invention, the additional particulate is a mixture of magnesium oxide and calcium hydroxide. The particulate filler has a total concentration in the outer layer of from about 12 to 75 percent of the total volume of the outer layer. The zinc oxide and cupric oxide have a total concentration of from about 10 to 70 percent of the total volume of the outer layer. The zinc oxide and cupric oxide particles comprise from 10 to 70 percent of the total volume of the base cushion layer. Concentrations of zinc oxide and cupric oxide of greater than 70 volume percent will render the layer too hard to provide the desired area of contact with the toner-bearing receiver sheet. In a particular embodiment of the invention, the outer layer has 1 to 3 volume percent MgO, 1 to 3 volume percent Ca(OH)$_2$ and from 10 to 70 volume percent zinc oxide and cupric oxide. The zinc oxide and cupric oxide particles comprise from 10 to 70 percent of the total volume of the base cushion layer.

The zinc oxide particles employed as filler in the top layer of a user member of the invention can be obtained from any convenient commercial source, e.g., Zinc corporation of America, Monaca, Pa. The cupric oxide particles employed as filler can be obtained from J. T. Baker, Phillipsburg, N.J. The particle size does not appear to be critical. Particle sizes anywhere in the range of 0.1 to 100 micrometers have been found to be acceptable. In the examples presented below the oxide particles were from 1 to 40 micrometers in diameter.

More particularly, the invention provides a fuser member comprising a support and coated thereon a fluoroelastomer layer compromising a metal oxide filler or mixtures of metal oxide fillers, said fillers can be treated with a silane coupling agent. The preferred silane coupling reagent has the general structure:

$L_1$, $L_2$, $L_3$=alkoxy, alkyl, halide, etc. with C atom numbers vary from 0–20 and at least one of the L should be alkoxy or halide.

R=aliphatic or aromatic chain with C atom numbers vary from 0–20.

M=amino, amino salts, mercapto, styryl, acryl, alkyl, etc.

Suitable coupling reagents are 3-aminopropyltrimethoxysilane, 3-aminopropyltriethoxysilane, N-phenylaminopropyltrimethoxysilane, (aminoethylaminomethyl)phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethyl-aminopropyl)trimethoxysilane hydrochloride, Mercaptomethyldimethylethoxysilane, (Mercaptomethyl)methyldiethoxysilane, 3-Mercaptopropylmethyldimethoxysilane, 3-Mercaptopropyltrimethoxysilane, 3-Mercaptopropyltriethoxysilane, styrylethyltrimethoxysilane, 3-(N-styrylmethyl-2-aminoethylamino)propyltrimethoxysilane hydrochloride and n-Propyltrimethoxysilane, etc.

To form the outer layer, the filler particles are mixed with the uncured polymer, crosslinking agent, and any other additives, such as an accelerator; shaped over the base cushion, and cured. The fluorocarbon is cured by crosslinking with basic nucleophile. Basic nucleophilic cure systems are well known and are discussed, for example, in U.S. Pat. No. 4,272,179. One example of such a cure system combines a bisphenol as the crosslinking agent and an organophosphonium salt, as an accelerator. An example bisphenol is:

An example organophosphonium salt is:

The crosslinker is incorporated into the polymer as a cure-site subunit, for example, bisphenolic residues. Other examples of nucleophilic addition cure systems are sold commercially as DIAK No. 1 (hexamethylenediamine carbamate) and DIAK No. 3 (N,N'-dicinnamylidene-1,6-hexanediamine) by E. I. duPont de Nemours & Co.

Suitable uncured polymers are available commercially. In a particular embodiment of the invention, a vinylidene fluoride-co-hexafluoropropylene was used which can be represented as $-(VF)_{75}-(HFP)_{25}-$. This material is marketed by E. I. duPont de Nemours and Company under the designation "Viton® A" and is referred to herein as "Viton® A". In another embodiment of the invention, a vinylidene fluoride-co-hexafluoropropylene was used which can be represented as $-(VF)_{42}-(HFP)_{58}-$. This material is marketed by Minnesota Mining and Manufacturing, St. Paul, Minn., under the designation "Fluorel® FX-2530" and is referred to herein as "FX-2530". Other suitable uncured vinylidene fluoride-co-hexafluoropropylenes and vinylidene fluoride-co-tetrafluoroethylene-co-hexafluoropropylenes are available, for example, Fluorel® FX-9038.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

In cases where it is intended that the fuser member be heated by an internal heater, it is desirable that outer layer have a relatively high thermal conductivity, so that the heat can be efficiently and quickly transmitted toward the outer surface of the fuser member that will contact the toner intended to be fused. (Depending upon relative thicknesses, it is generally even more desirable that the base cushion layer and any other intervening layers have a relatively high thermal conductivity. Suitable materials for the base cushion layer are discussed below.) The outer layer of the fuser member of the invention has a thermal conductivity in the range of about 0.15 to 0.40 BTU/hr·ft·° F.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper.

The thicknesses of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer is from about 25 to 30 micrometers thick.

Suitable materials for a futher base cushion layer include any of a wide variety of materials previously used for base cushion layers, such as the condensation cured polydimethylsiloxane marketed as EC4952 by Emerson Cuming. An example of a condensation cured silicon rubber base cushion layer is GE 4044 marketed by General Electric of Waterford, N.Y. An example of an addition cured silicone rubber is Silastic J RTV marketed by Dow Corning applied over a silane primer DC-1200 also marketed by Dow Coming.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with a U.S. Pat. No. 5,474,821, by Allen Kass, entitled "FUSING MEMBER FOR ELECTROSTATOGRAPHIC REPRODUCING APPARATUS AND METHOD FOR PREPARING FUSING MEMBERS"; the specification of which is hereby incorporated by reference herein.

The fuser member is mainly described herein in terms of embodiments in which the fuser member is a fuser roll having a core, a base cushion layer overlying the core, and an outer layer superimposed on the base cushion. The invention is not, however, limited to a roll, nor is the invention limited to a fusing member having a core bearing two layers: the base cushion layer and the outer layer. The fuser member of the invention can have a variety of outer configurations and layer arrangements known to those skilled in the art. For example, the base cushion layer could be eliminated or the outer layer descibed herein could be overlaid by one or more additional layers.

Materials:

Viton® A, ter-polymer of vinylidene fluoride, hexafluoropropylene and tetrafluoroethylene—Dupont®, Wilmington, Del.

MgO (Maglite™ D)—Marine Magnesium Co., Chicago, Ill.

Ca(OH)$_2$—Aldrich®, Milwaukee, Wis.

Viton® Curative No. 20 (Cure 20), a blend containing 33% of an organophosphonium salt and 67% of a fluoroelastomer—Dupont®, Wilmington, Del.

Viton® Curative No. 30 (Cure 30), a blend containing 50% of a dihydroxy aromatic compound and 50% of a fluoroelastomer—Dupont®, Wilmington, Del.

ZnO (503R)—Zinc Corporation of America, Monaca, Pa.

CuO—J. T. Baker®, Phillipsburg, N.J.

3-Mercaptopropyltrimethoxysilane (SH-CR)—PCR®, Gainesville, Fla.

3-Aminopropyltriethoxylsilane (NCR)—PCR®, Gainesville, Fla.

n-Propyltrimethoxysilane (non-CR)—PCR®, Gainesville, Fla.

EXAMPLE 1 (Ex 1)

Treatment off Filler Surface with Coupling Reagent Solution:

Treatment solution was freshly prepared by n-Propyltrimethoxysilane (non-CR, 2 wt. %) to EtOH/H$_2$O (95/5 by vol.) solvent and stirred for 10 minutes. Fillers (ZnO or CuO or mixtures thereof) were covered by solution and stirred in ultrasonic bath for 10 minutes. Fillers were then washed twice with EtOH and dried under reduced pressure (under vacuum) at 150° C. for 30 minutes and at room temperature overnight.

Compounding:

Viton® A (100 gm), MgO (3 gm), Ca(OH)2 (6 gm), Cure 20 (2.5 gm), Cure 30 (6 gm) and both surface treated ZnO (202 gm) and CuO (50 gm)—were thoroughly compounded in a two roll mill with water cooling at 63° F. (17° C.) until a uniform, dry composite sheet was obtained.

Preparation of a compression mold slab:

The fluoroelastomer-treated fillers gum obtained as described above was compression molded into 75-mil plaques, with curing for 20 minutes at 350° F. (177° C.) under 45 tons pressure and post-curing for 48 hours at 450° F. (232° C.). The plaques were employed for the following tests.

Figure 1:
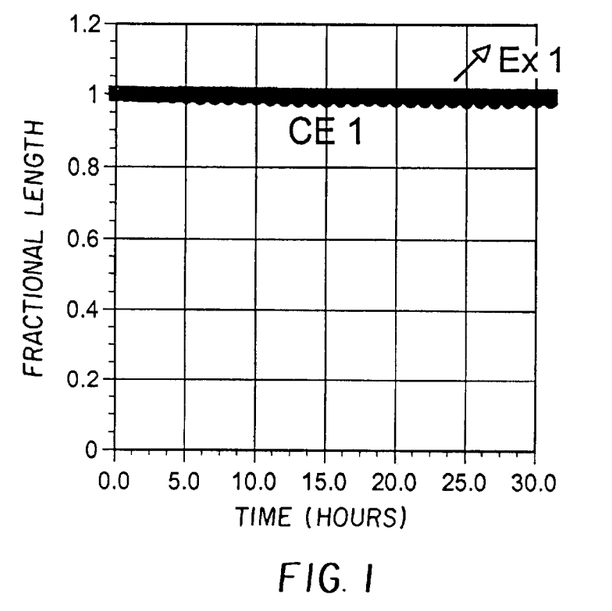
FIG. 1 is a graph of fractional length vs. time for the materials of Example 1 and Comparative Examples 1.
Figure 2:
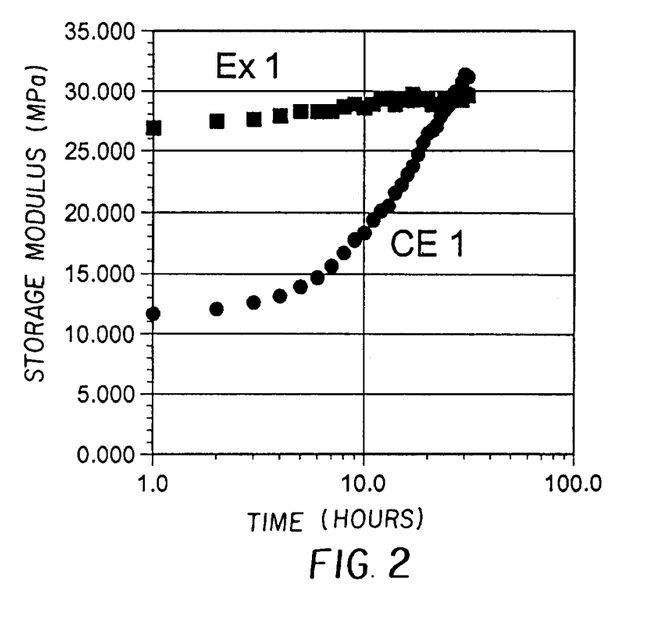
FIG. 2 is a graph of storage modulus vs. time for the materials of Example 1 and Comparative Examples 1.

Mechanical Energy Resolver Test (MER):

The storage modulus and weight loss determinations were done in accordance with the method described in Chen, et al., "Fuser Members Overcoated with Fluorocarbon Elastomer Containing Tin Oxide", U.S. Pat. No. 5,464,698. Six of the circular disks were stacked, one upon the other, weighted, and then placed in a test instrument called a Mechanical Energy Resolver (also referred to herein as an "MER"), commercially available from Insrumentors, Inc. Strongsville, Ohio, U.S.A. The instrument heated the stack to 218° C., and imposed a static compressive force of 8 kg on the stack. The length of the stack under the initial compressive force was then measured, as was the initial hardness (expressed in terms of "Initial storage modulus, $SM_i$"). The MER then imposed cyclic stress on the sample stack by sinusoidally varying the initial compressive force by 4 kg rms at a frequency of 30 Hz for 30 hours, while maintaining the 218° C. temperature. After 30 hours, the final hardness ("Final storage modulus, $SM_f$") and length of the six-disk stack under the static 8 kg compressive force were measured, as was the final weight of the sample stacks. Results are presented in Table 1 and FIGS. 1–2.

EXAMPLE 2 (Ex 2)

Figure 3:
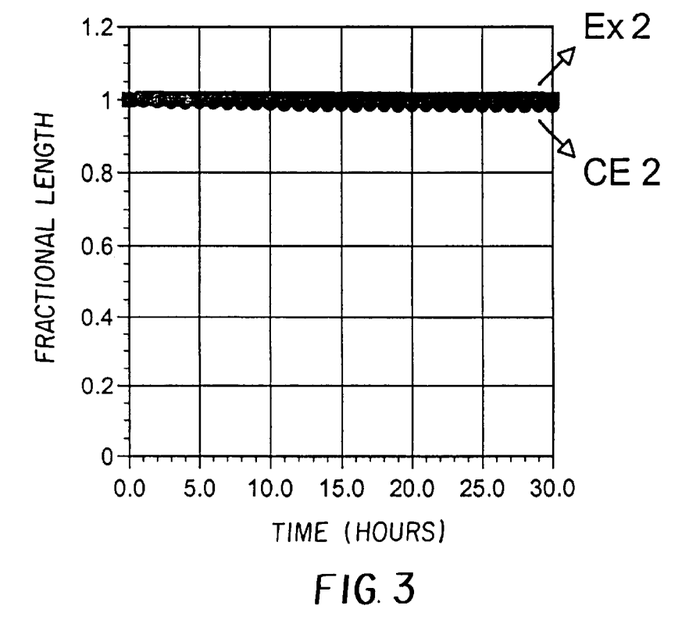
FIG. 3 is a graph of fractional length vs. time for the materials of Example 2 and Comparative Examples 2.
Figure 4:
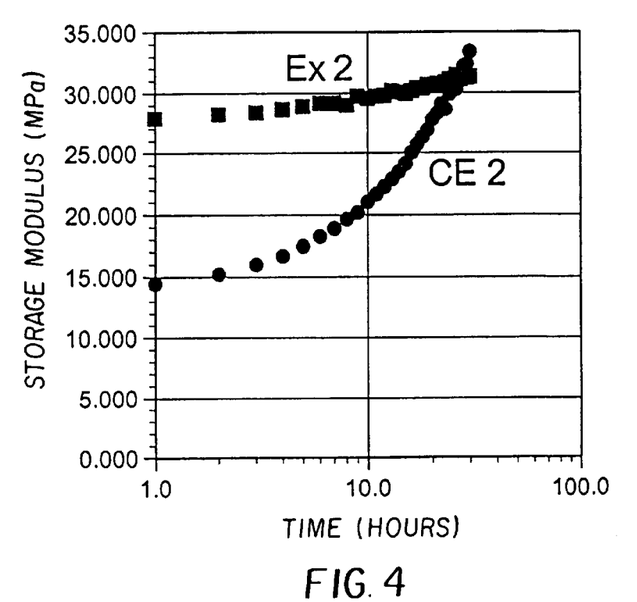
FIG. 4 is a graph of storage modulus vs. time for the materials of Example 2 and Comparative Examples 2.

Substantially the same procedures were followed as in Example 1, except that the fillers were treated with 3-Aminopropyltriethoxylsilane (NCR) solution. The results are indicated in Table 1 and FIGS. 3–4.

EXAMPLE 3 (Ex 3)

Figure 5:
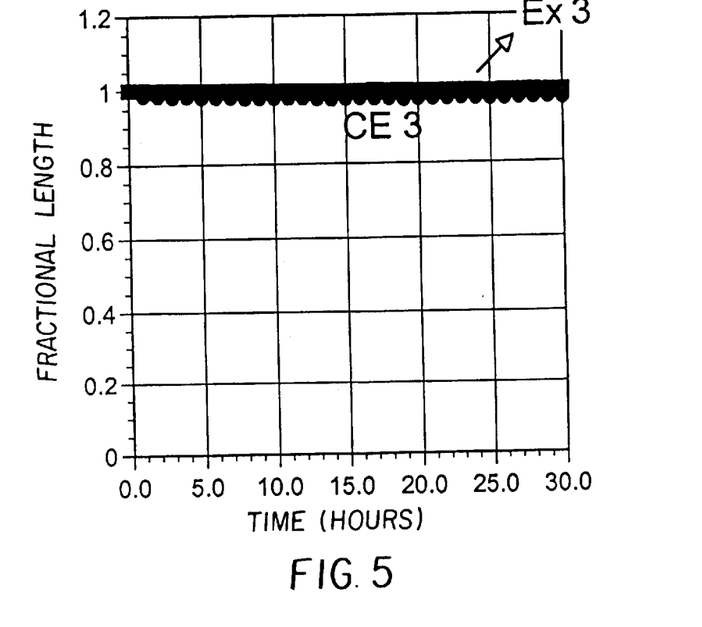
FIG. 5 is a graph of fractional length vs. time for the materials of Example 3 and Comparative Examples 3.
Figure 6:
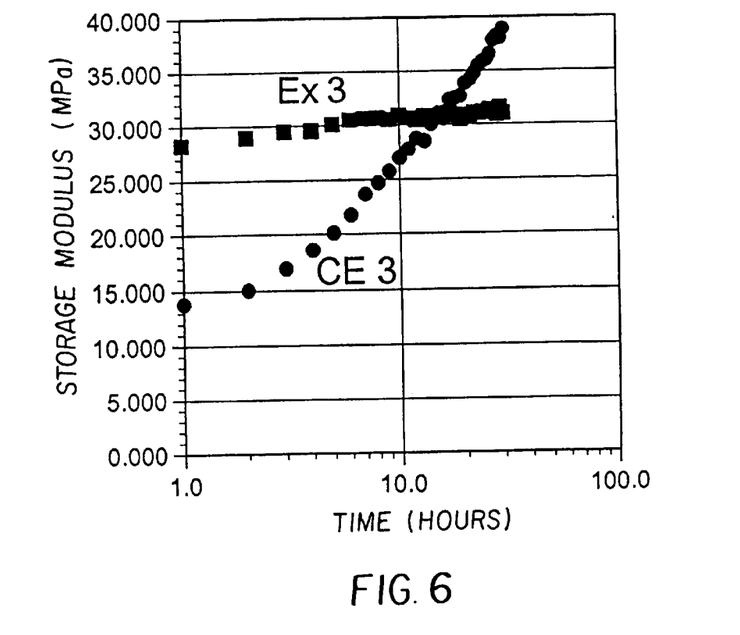
FIG. 6 is a graph of storage modulus vs. time for the materials of Example 3 and Comparative Examples 3.

Substantially the same procedures were followed as in Example 1, except that the fillers were treated with 3-Mercaptopropyltrimethoxysilane (SH-CR) solution. The results are indicated in Table 1 and FIGS. 5–6.

EXAMPLE 4 (Ex 4)

Figure 7:
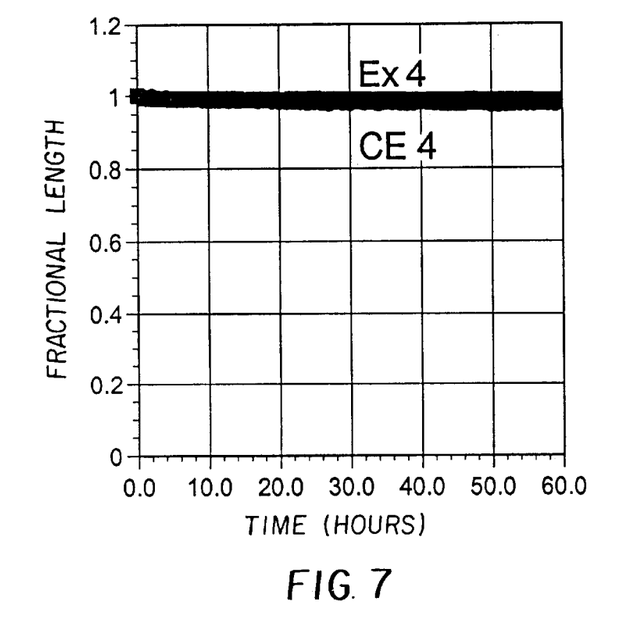
FIG. 7 is a graph of fractional length vs. time for the materials of Example 4 and Comparative Examples 4.
Figure 8:
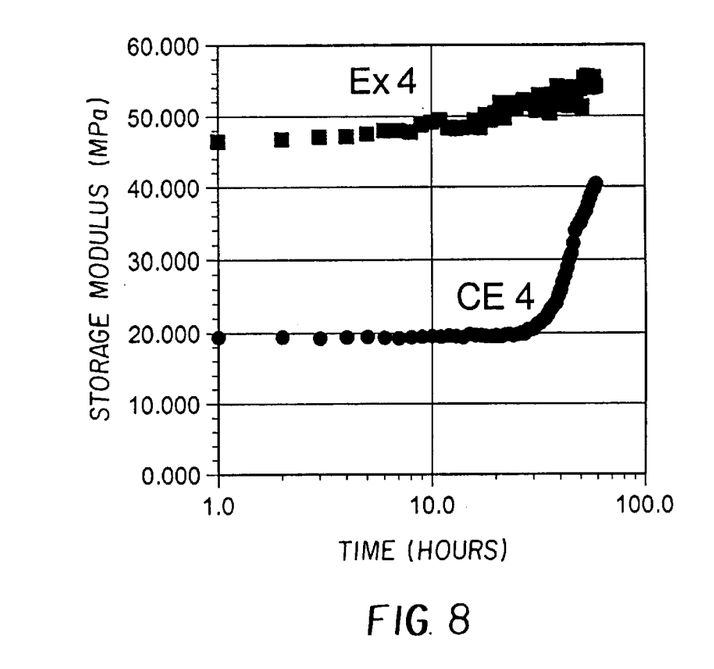
FIG. 8 is a graph of storage modulus vs. time for the materials of Example 4 and Comparative Examples 4.

Substantially the same procedures were followed as in Example 1, except that the fillers were not surface treated and the results are indicated in Table 1 and FIGS. 7–8.

COMPARATIVE EXAMPLE 1 (CE 1)

Substantially the same procedures were followed as in Example 1, except that the fillers were ZnO (148 gm) without CuO. The results are indicated in Table 1 and FIGS. 1–2.

COMPARATIVE EXAMPLE 2 (CE 2)

Substantially the same procedures were followed as in Example 2, except that the fillers were ZnO (148 gm) without CuO. The results are indicated in Table 1 and FIGS. 3–4.

Comparative Example 3 (CE 3)

Substantially the same procedures were followed as in Example 3, except that the fillers were ZnO (148 gm) without CuO. The results are indicated in Table 1 and FIGS. 5–6.

COMPARATIVE EXAMPLE 4 (CE 4)

Substantially the same procedures were followed as in Example 4, except that the fillers were ZnO (148 gm) without CuO. The results are indicated in Table 1 and FIG. 7–8.

The results shown in Table 1 and FIGS. 1–8 clearly indicate that fatigue resistance property (ΔSM is much less) was greatly improved by using a mixture of fillers ZnO and CuO rather than ZnO fillers only.

Table 1 is a Summary of Storage Modulus and Weight Loss characters of Viton® A-based fluorocarbon elastomer samples by MER.

TABLE I

| Sample ID | Fillers | SM$_i$ (MPa) | SM$_f$ (MPa) | ΔSM* (%) | Wt. Loss % |
|---|---|---|---|---|---|
| Ex 1 | ZnO, CuO (non-CR treated) | 25.840 | 29.220 | 13.1 | 0.22 |
| Ex 2 | ZnO, CuO (NCR treated) | 25.948 | 31.245 | 20.4 | 0.25 |
| Ex 3 | ZnO, CuO (SH-CR treated) | 25.552 | 31.939 | 23.4 | 0.28 |
| Ex 4 | ZnO, CuO | 45.430 | 54.131** | 19.2 | 0.20 |
| CE 1 | ZnO, (non-CR treated) | 11.149 | 30.682 | 175.2 | 0.43 |
| CE 2 | ZnO, (NCR treated) | 13.261 | 32.351 | 144.0 | 0.44 |
| CE 3 | ZnO, (SH-CR treated) | 13.548 | 38.052 | 180.9 | 0.40 |
| CE 4 | ZnO | 19.642 | 40.401** | 105.7 | 0.47 |

*ΔSM (%) = [(SM$_f$−SM$_i$)/SM$_i$] × 100
**Run for 60 hours
CE = Comparative Example

What is claimed is:

1. A fuser member comprising a core and a layer overlying said core, said layer comprising:
   a) a cured fluorocarbon random copolymer comprising sub-units having the general structures:

$$-(CH_2CF_2)_x-, -(CF_2CF_2)_z-,$$

and wherein
   x is from 30 to 90 mole percent,
   y is from 10 to 70 mole percent, and
   z is from 0 to 34 mole percent;
   b) particulate fillers comprising zinc oxide and cupric oxide; and
   c) a material selected from the group consisting of alkaline earth metal oxides, alkaline earth metal hydroxides, and combinations thereof;
   said particulate fillers having a total concentration in said layer of 12 to 75 volume percent of the total volume of said layer, said zinc oxide and cupric oxide having a concentration of 10 to 70 volume percent of the total volume of said layer.

2. The fuser member of claim 1 wherein said alkaline earth metal hydroxide comprises calcium hydroxide and said alkaline earth metal oxide comprises magnesium oxide.

3. The fuser member of claim 1 wherein said copolymer is nucleophilic addition cured.

4. The fuser member of claim 1 wherein said copolymer is crosslinked by biphenolic residues.

5. The fuser member of claim 1 wherein x is from 40 to 80 mole percent, y is from 10 to 60 mole percent, and z is from 0 to 34 mole percent.

6. The fuser member of claim 1 wherein x is from 42 to 75 mole percent, y is from 14 to 58 mole percent, and z is 0.

7. The fuser member of claim 1 wherein z is 0.

8. The fuser member of claim 1 wherein x is greater than 40 mole percent.

9. A fuser member useful for heat-fixing an electrographic toner to a substrate, wherein the fuser member comprises a core, a base cushion layer overlying said core, and an outer layer superimposed on said base cushion, said outer layer comprising a cured fluorocarbon random copolymer comprising subunits having the general structures:

$$-(CH_2CF_2)_x-, -(CF_2CF_2)_z-,$$

and wherein
x is from 10 to 90 mole percent,
y is from 10 to 70 mole percent, and
z is from 0 to 34 mole percent;
said outer layer further comprising particulate filler, said particulate filler comprising zinc oxide and cupric oxide and a material selected from the group consisting of alkaline earth metal oxides, alkaline earth metal hydroxides, and combinations thereof; said particulate filler having a total concentration in said outer layer of 12 to 75 volume percent of the total volume of said outer layer, said zinc oxide and tin oxide having a concentration of 10 to 70 volume percent of the total volume of said outer layer.

10. A fuser member useful for heat-fixing an electrographic toner to a substrate, said fuser member comprising: a core, a base cushion superimposed on said core and an outer layer superimposed on said base cushion, said outer layer comprising a bisphenol cured fluorocarbon random copolymer comprising subunits having the general structures:

wherein
x, y, and z are selected such that fluorine atoms represent at least 70 percent of the total formula weight of said subunits;
said outer layer having filler particles dispersed therein, said filler particles further comprising:
   particles selected from the group consisting of alkaline earth metal oxides, alkaline earth metal hydroxides, and combinations thereof in a concentration of from about 2 to 6 volume percent of the total volume of said outer layer; and
   zinc oxide and cupric oxide particles in a concentration of from 12 to 70 volume percent of the total volume of said outer layer.

* * * * *

IN THE UNITED STATES PATENT AND TRADEMARK OFFICE
CERTIFICATE OF CORRECTION

PATENT NO.: 6,096,429
DATED: 08/01/00
INVENTOR(S): Jiann-Hsing Chen, et al It is certified that an error appears in the above-identified patent and that said Letters Patent is hereby corrected as shown below:

$$-(CH_2CF_2)_x-, \quad -(CF_2CF_2)_z-, \text{ and}$$

claim 10, line 8

Signed and Sealed this

Twenty-ninth Day of May, 2001

*Attest:*

NICHOLAS P. GODICI

*Attesting Officer*   *Acting Director of the United States Patent and Trademark Office*